Dec. 31, 1940.   B. S. CROSS   2,226,553
SHEETED CELLULOSIC MATERIAL AND ABRASIVE ARTICLE
AND PROCESS OF MAKING THE SAME
Filed April 12, 1933   3 Sheets-Sheet 1

Witness:
R. B. Davison

Inventor,
Bert S. Cross
By Paul Carpenter
Atty.

Dec. 31, 1940.  B. S. CROSS  2,226,553
SHEETED CELLULOSIC MATERIAL AND ABRASIVE ARTICLE
AND PROCESS OF MAKING THE SAME
Filed April 12, 1933   3 Sheets-Sheet 2

Inventor.
Bert S. Cross.
By Paul Carpenter
Atty.

Witness:
R. B. Davison.

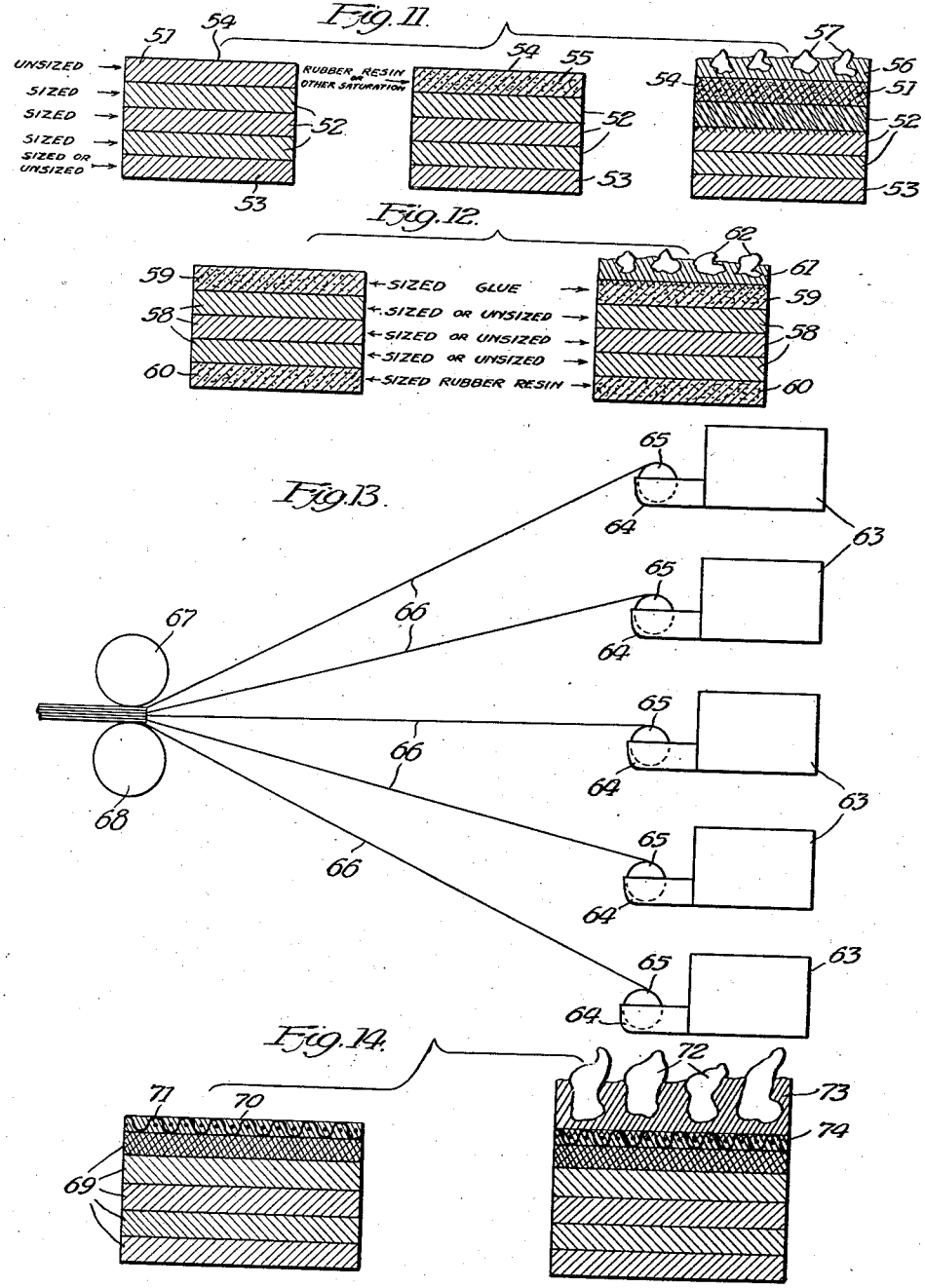

Patented Dec. 31, 1940

2,226,553

UNITED STATES PATENT OFFICE 2,226,553

SHEETED CELLULOSIC MATERIAL AND ABRASIVE ARTICLE AND PROCESS OF MAKING THE SAME

Bert S. Cross, St. Paul, Minn., assignor to Minnesota Mining & Manufacturing Company, St. Paul, Minn., a corporation of Delaware Application April 12, 1933, Serial No. 665,751

17 Claims. (Cl. 51—185)

This invention relates in general to sheeted materials and more particularly to materials in sheet form composed of cellulosic substances, such, for example, as paper, and especially paper designed for use as a backing for flexible abrasive articles.

While the invention is described and illustrated as incorporated in a sheeted abrasive article, such as sandpaper or the like, it will be understood that the invention has a wide field of utility for analogous purposes.

The employment of sandpaper in the form of sheets, discs, belts and the like for floor surfacing and other similar work requires that a sturdy abrasive article with a relatively heavy backing be employed and yet possess a desirable flexibility and resistance to splitting, cracking or laminating or "peeling" as it is termed. This peeling occurs in sandpaper due to separation of the plies of paper caused by inadequate adhesion between the several plies from which the paper backing is made, and also due to lamination of one or more of the individual plies caused by poor fibre adhesion.

These difficulties are encountered particularly in the very coarse grades of the so-called open coat sandpaper and are known to have occurred in connection with the coarser grades of closed coat sandpaper.

Actual experience with this type of abrasive article shows that while the abrasive and adhesive retain their intimate association satisfactorily, there is a tendency for the paper ply next adjacent to the adhesive to peel away from the rest of the backing, and that this is not an uncommon occurrence in the better grades of cylinder as well as Fourdrinier paper now on the market and available for this purpose.

The difficulties appear to be caused by the fibres of the various plies failing to satisfactorily adhere to each other even though the fibres may become interwoven and interlocked in the manufacture of the paper.

The paper generally employed in the manufacture of glue-bond and other sandpaper contains a relatively large amount of sizing in order to unite the various plies thereof. This sizing tends, in the case of glue-bond sandpaper, to prevent any considerable penetration of the adhesive or binder into the sheet and, thus, when the abrasive article is subjected to so-called heavy duty, the stresses which occur between the abrasive layer and the backing may become sufficiently great to cause separation between the plies of the backing or disintegration within one or more of the plies themselves. Of course, where binders containing an oil base, for example, are employed, these binders do penetrate into the paper, whether of the sized or saturating type, but in such cases these binders, being of a flexible nature, do not materially decrease the flexibility of the sheet.

Furthermore, attempts to adequately increase the adhesion between the fibres and the several plies of the backing by employing an unsized paper and permitting considerable absorption of the grit binding coat into the backing have not been successful because of the undesirable stiffness imparted to the paper or decrease of flexibility, particularly where a glue bond coating is employed for holding the grit.

Even in the best of so-called cylinder papers now available on the market and irrespective of the sizing used, the individual fibres making up the sheet do not adhere strongly enough to prevent ply separation or fibre separation when the paper is placed under considerable strain as in common use in the abrasive industry at the present time.

The adhesion between the plies may be improved by gelatinizing the fibres to a form such as will cause the plies to more intimately interlock, this being accomplished partially by cooking and partially by proper treatment in the beaters, or improved sizing agents. However, there are definite limitations to the amount of improvement in adhesion that can be attained in this manner, inasmuch as such treatment results in hardening the sheet unduly and often renders the same brittle and unsatisfactory as a flexible abrasive article.

It is customary in cylinder paper to hold the plies together by the fibres interlocking and also by increasing the amount of sizing used, but all of the above methods are still inadequate to prevent the undesirable peeling of the paper when subjected to heavy strain.

With paper made according to the Fourdrinier methods there still is the lack of a proper adhesion between the fibres and particularly so with a saturating type of paper. This saturating type of paper may be improved considerably by saturating with glue, but possesses the objection of becoming excessively brittle, and has, therefore, a tendency to chip or crack or tear in use.

Such brittleness may be overcome, and I have found that it is possible to make a satisfactory saturating type of paper by employing, in place of glue size, a rubber-resin saturating compound, and this in a measure possesses the desirable qualities as a backing for pulverulent abrasives, but the cost of manufacture of such paper is usually prohibitive.

I have found that by properly controlling the component portions of the cellulosic sheet in manufacture, I am enabled to control the porosity or affinity of the intimate sheet for saturating solutions, and thus produce a sheet which when, for example, a glue and grit are applied thereto, is freed of the objectionable features of brittleness and tendency to laminate or peel.

The objects of the present invention reside in the provision of an improved sheeted cellulosic material including a body whose affinity for saturating solutions decreases from an outer surface thereof inwardly; the provision of a sheeted cellulosic material formed of a plurality of layers in which the outermost layers have a greater affinity for saturating solutions than the inner layers thereof so that, when an adhesive material of a penetrative character is applied to the sheet, the adhesive will strike through the absorbent portions, taking hold thereof and adhesively connecting the same to the less absorbent portions, thus tending to form a substantially homogeneous backing and preventing laminating or peeling of the plies; the provision of an improved backing for an abrasive article in which the flexibility of the article is not materially decreased by the penetration thereinto of an adhesive such as glue for attaching abrasive grits; the provision of an improved backing for abrasive articles in which the body of the backing is composed of portions having different degrees of affinity for saturating solutions; the provision of an improved sheeted cellulosic material, such as paper, as a backing for an abrasive article in which the backing is composed of a plurality of plies, the innermost plies being sized and the outermost plies unsized, so that an adhesive for attaching grit to said backing may strike through the unsized plies and affix itself to the sized plies so as to increase the adhesion between the plies without increasing the brittleness of the sheet.

In the present invention the improvement particularly resides in that a single sheet of sandpaper or the like made according to this invention combines both the advantages to be attained from a normal cylinder paper and those accruing to saturating paper by combining in a single backing both sized and unsized layers so that the so-called saturating layers, that is to say, those which have a facility for absorbing the binder, will permit of adequate penetration of the binder and homogenizing of the unsized layers, at the same time striking through the same so as to adequately increase the adhesion between all of the plies of the paper.

The present invention, furthermore, contemplates the provision of an improved form of paper backing for abrasive articles wherein two or more different types of paper stock are incorporated in a single sheet as distinguished from prior art in which the sheet contains only one type of paper stock; and the provision of an improved method of making paper of the character herein set out wherein the varying amounts of sizing materials may be employed, incorporated in the paper during the manufacture thereof.

By my present invention, ply adhesion is markedly improved, particularly between the most critical layers, that is, the outside plies, and I have found that in actual test where the plies of common cylinder paper will laminate or peel under forces ranging from 85 to 95 grams on a standard adhesion test machine, the tests with the paper made according to this invention range from 115 to 200 grams and higher, and I am, therefore, enabled to produce a paper backing which is more resistant to lamination or separation and prevents, when used as a backing for sandpaper, the breaking away of sections of paper and coated glue and mineral, which is commonly termed peeling. This peeling tendency is particularly apt to occur in the coarser grades of paper backed abrasive articles, and I am enabled by this invention to eliminate such peeling.

While the present invention is illustrated and described more particularly for employment as a backing for flexible abrasive articles, it will be understood that the invention in one of its forms may have utility in connection with all uses of impregnated papers such for example as phenol impregnations, certain types of paper bags, waterproofing papers, roofing and insulating papers, gasket paper and paper employed for the purpose of imitation leather and waxed paper; or that the invention may be adapted to papers which are given a surface treatment such as a clay filling and enameled surface paper, and such other papers as tag stock, paper stock for inner soles which may be of an impregnated nature, special blotting papers where the printing side of the blotting paper should be distinctly different from the absorbent side, and as paper for food containers and the like.

The present invention may be more clearly understood upon reference to the accompanying drawings, in which.

Figures 6 to 12, both inclusive, are composite illustrations of further alternative forms of this invention.

Figure 13 is a diagrammatic view of apparatus for forming the paper of this invention; and Figure 14 is a composite view of a still further alternative form of the invention.

It will be understood that the sheeted cellulosic material referred to herein may be paper, paper and cloth combined, or other suitable cellulosic materials and, in the ordinary course of manufacture of flexible abrasive articles, the paper may be formed of one or more plies as desired. It is customary, particularly in the coarser grades, to employ a paper composed of two or more plies, and usually the better grade of paper consists of at least five plies.

In the ordinary sandpaper where a glue-bond is used, this does not normally strike into the sheet due to the fact that the sheet is not absorbent. However, if a saturating sheet or an absorbent sheet were used, there would be some penetration. However, it is difficult to control the degree of saturation in an unsized paper, but with the present invention embodying layers of absorbent or saturating paper in a sheet having other layers which are sized, permits of the controlled degree of saturating desired.

The present invention, however, avoids this brittleness by the provision of a sheeted cellulosic backing material of multiple plies or of portions which possess different degrees of affinity for saturating solutions, that is to say, certain of the portions of the backing will receive and take up a saturating solution more readily than other portions.

Figure 1:
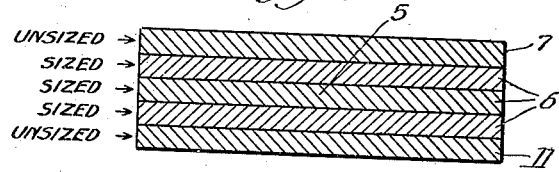
Figure 1 is a sectional view of a sheet made according to this invention.

One example of the manner in which this invention may be carried out will be found in Figure 1.

In this form of the invention the backing, generally designated 5, is composed of the inner plies 6 which are sized so as to insure their intimate and positive association. Of course, these inner plies are susceptible of separation but not by ordinary strains to which paper when employed as a backing for abrasive articles is subjected. If the paper composed only of the three plies 6 were to receive a coating of a saturating glue or other adhesive, such for example as a waterproof resinous material single or otherwise, the adhesive in combining with the three plies would tend to harden the same undesirably and, in some cases, even render the same brittle. If the three plies mentioned are unsized to avoid this brittleness and then the adhesive and grit are applied, there will be peeling or laminating of the sheet as hereinabove explained.

In order to avoid this difficulty, I apply an outer unsized ply indicated at 7. This outer unsized ply is conveniently of a saturating type which has an affinity for the adhesive or other saturating solution so that the adhesive, when applied to the outer ply 7, may penetrate the same and strike through to the next adjacent sized ply 6, which is of the sized type. Therefore, while the sized ply 6 adheres tenaciously to the glue or other adhesive, an adequate control of the penetration of the adhesive is attained.

Figure 3:
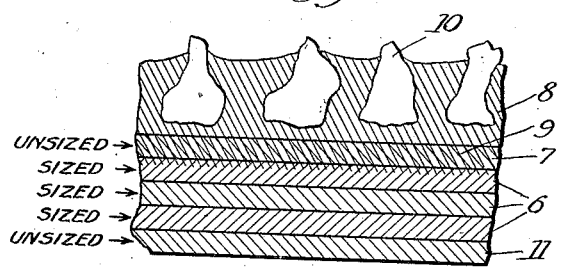
Figure 3 is a sectional view of an abrasive article employing the improved sheeted cellulosic material of this invention illustrated in Figure 1 as a backing.

By a regulated application of the adhesive, it will be obvious that the desired adhesion between the adhesive itself and the sized ply 6 and the resultant connection between the unsized ply 7 and the inner plies 6 will be considerably enhanced without an undesirable penetration of the adhesive into the sized plies which would result in undue brittleness. Thus, if a piece of sandpaper or a disc be made up with the backing of Figure 1, such as is shown in Figure 3, the adhesive material 8, when applied to the unsized outer ply 7, will strike through the same, as indicated by the cross hatching lines 9 in Figure 3, and tie itself on to the surface of the next adjacent sized ply 6.

From the foregoing it will be seen that the original flexibility of the sized layers or plies 6 is not materially reduced, and that these plies lend their flexibility to the finished article. At the same time the adhesion between the several plies, including the outer ply carrying the grit and adhesive, is markedly increased so that substantially no peeling or separating of the several plies can occur.

It will be understood that if extreme flexibility is desired in the finished article, then, of course, a lesser number of plies will be employed in the backing. In some instances it may even be desirable to remove some of the plies from the backing after the adhesive and abrasive, indicated at 10, are applied, though, under the ordinary circumstances, it is quite feasible to obtain a desirable form of the abrasive article in the manner already pointed out above.

The unsized back ply 11 may likewise receive a protective coating, adhesive and/or waterproof in nature, if desired, which will strike through this back ply into the next adjacent sized ply.

While I describe and illustrate herein a special paper stock composed of five layers or plies, it will be understood that more or less number of plies may be employed as desired. The two outside unsized layers, indicated at 7 and 11 in Figures 1 and 3, are preferably of the saturating type and possess the property of readily absorbing a glue-saturating solution which is applied to these plies after the paper has been formed, preferably on the ordinary cylinder machine. With this arrangement of plies 7 and 11 and the glue saturation thereof, I find there is less tendency for the paper to curl than where only one side is treated, though I have obtained satisfactory results by treating only one side of the paper with the glue solution as will hereinafter appear.

In producing the improved cellulosic sheeted backing of the present invention, the paper is made on the usual type of cylinder machine, and as the various layers are formed, the outer layers, which are to be of the saturating type, are supplied from beaters to which substantially no sizing material has been added and in which the paper stock has not been too highly hydrated, that is to say, which has not been agitated long enough in the beaters to produce a gelatinizing of the paper fiber to an excessive extent. Such an excessive gelatinizing of the layer would tend to resist glue and water penetration and must be carefully controlled for this reason.

After the sized layers have been formed and brought together the unsized layers 7 and 11 are applied and the whole mass then formed into a single sheet by pressure.

The sheet thus composed of the five plies is then subjected to a thin glue-saturating solution which penetrates into the saturating layers 7 and 11 and forms the bond after drying which makes the paper more resistant to separation or lamination than any paper made by any of the prior methods known to me.

The glue which I prefer to use for saturating purposes is known as a $1°tw$ hide glue in which the paper was immersed, the glue being kept at approximately 180° Fahrenheit. It will be understood that the interval of time of immersion is of importance, and, depending upon the desired degree of penetration, I have subjected the paper sheet to immersion for various periods ranging from two seconds to twenty-three seconds. A paper stock composed of the five plies shown in Figures 1 and 3 immersed for ten seconds produces a sheet in which, while the two outer plies may be separated from the inner ply, it is substantially impossible to separate the two outer plies from each other, thus producing a sheet which, when receiving an adhesive and grit, is substantially free from the laminating defects pointed out herein common to other papers.

Figure 2:
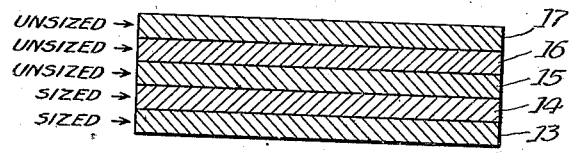
Figure 2 is a view similar to Figure 1 of an alternative form of the invention.
Figure 4:
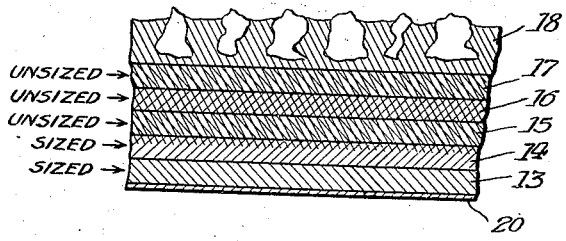
Figure 4 is a view similar to Figure 3 showing a backing of paper shown in Figure 2.

For some purposes it may be desirable to employ a plurality of layers or plies such, for example, as shown in Figures 2 and 4.

Here the sheet, generally designated 12, is composed of the five layers 13, 14, 15, 16 and 17.

The ply indicated at 17 is adapted to receive the adhesive and grit indicated at 18 and 19, respectively, in Figure 4, and the three layers 15, 16 and 17, are unsized so that they are of the saturating type.

The two layers 13 and 14 are of the sized type and when the adhesive 18 is applied to the saturating plies it strikes through the same into engagement with the inner sized ply 14. Such paper as that shown in Figures 2 and 3 may be found to be particularly suitable in connection with the manufacture of so-called waterproof abrading articles which are subjected to moisture and friction in what is known as a water abrading operation. The bonding material for the grit, indicated at 18, will, being of a penetrative nature, readily saturate the three unsized plies 15, 16 and 17 and intimately engage the sized ply 14. If desired in such cases a protective waterproof bonding layer 20 may be applied to the back of the article shown in Figure 4. For some purposes this may be dispensed with, particularly where the abrasive article is made in the form of a disc or the like and secured by an adhesive to a cloth, felt or other supporting backing.

In any event, the provision of the three unsized plies saturated with a thin glue solution receive the bonding material 18 and the latter may more or less penetrate the outer ply, but does not materially increase the rigidity of the resultant article so that the abrasive article formed thereby is not rendered brittle by the undue saturation of the sized plies by the adhesive material, thus producing a highly flexible and yet homogeneous abrasive article.

Reverting to the saturating type of paper made by the Fourdrinier process and now available on the market, referred to hereinabove, one of the objections to this type of paper when coated with a layer of glue and abrasive material is that such paper does not retain its desirable flexibility, though possessing relatively fair fiber adhesion qualities.

I have found that by saturating such paper with a rubber and resin saturating compound, I am enabled to produce a backing for sandpaper or for similar abrasive articles which possesses desirable characteristics. The flexibility of the paper is not materially decreased owing to the rubber and resin solution employed, and such paper readily receives a layer of bonding material either of the water soluble glue type or of the waterproof type now so well known in the art.

The rubber-resin solution which I have found to give satisfactory results is as follows:

| | Lbs. |
|---|---|
| Latex crepe | 200 |
| Glue | 200 |

The ingredients in the amounts mentioned above are milled together dry on a rubber mill to thoroughly disperse the glue. The product of this milling process is then introduced into an internal mixer with 320 pounds of wood rosin and 2 pounds of beta naphthol, and the entire mix subjected to dry agitation for about 20 hours. Steam under pressure is employed in the jacket of the mixer, usually about 10 pounds per square inch.

After the mixing has been accomplished, 720 pounds of oleum spirits are slowly added to the mass and the solution is then employed for saturating a regular so-called saturating paper, that is, a paper which is highly absorbent.

The step of saturating the paper may be accomplished by submerging the same in a trough filled with the rubber-resin compound described above and moving the paper therefrom through a set of squeeze rolls so adjusted as to leave a relatively large excess of saturating solution on the paper.

The paper may then be rolled up wet and allowed to stand for about 12 hours in order to permit of complete saturation. Thereupon the paper is passed through the saturating solution again, but instead of being rolled up wet, as in the first step, is festooned on the racks and dried in a drying oven at a temperature of about 150° F.

For some purposes a third treatment of the paper may be resorted to by again passing the sheet through a set of squeeze rolls and applying a third coating of the rubber-resin solution on the backside of the paper, that is, the side opposite to that on which the grit or other abrasive layer is eventually applied, and this excess of rubber-resin solution then penetrates into the paper, completing the saturation thereof.

When the third application of solution has been completed, the paper is preferably passed through the oven and again dried at approximately 150° F.

From the foregoing it will be understood that one of the major improvements in the art produced by my invention resides in that in a single sheet of backing material of a cellulosic type are combined the advantages of both the normal cylinder paper and so-called saturating paper.

While penetration of the grit binder coating into the sheet is considerably limited or prevented, as the case may be, by the saturation of the sheet as hereinabove described, it will be understood, of course, that paper which has been only partially saturated in prior treatments will, under the controlled and proper circumstances, permit further saturation by the grit binder.

Such paper possesses its most marked advantages when, prior to the application of the grit bonding coat, it is subjected to the glue immersing treatment hereinbefore described.

Figure 5:
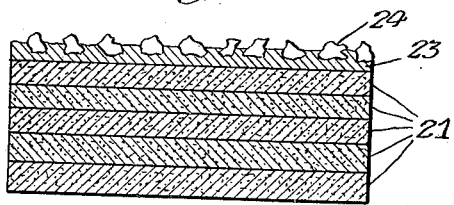
Figure 5 is a sectional view of a further alternative form of the invention.

In Figure 5 I have illustrated a sheet of saturating paper composed of the plies 21. This paper may be saturated with the rubber-resin compound hereinabove described and may then receive a coating of bonding material 23 containing an abrasive grit 24.

Figure 6:
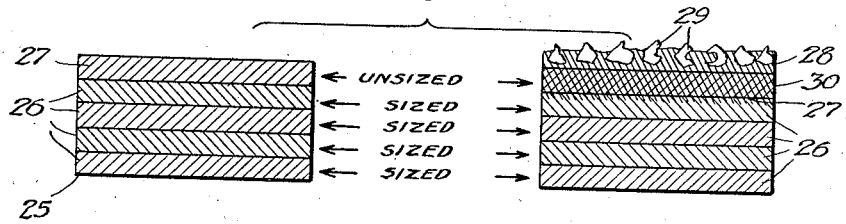

Referring now to Figure 6, there is illustrated at the left side of this composite view a multiple ply sheet 25 composed of the four sized layers 26 and the unsized layer or ply 27.

To this outer unsized layer 27 may be applied a binder of glue, as at 28, for retaining grits 29, the glue, as indicated by the cross hatching at 30, striking through the unsized layer 27 to attach itself to the next adjacent layer or ply 26.

Figure 7:
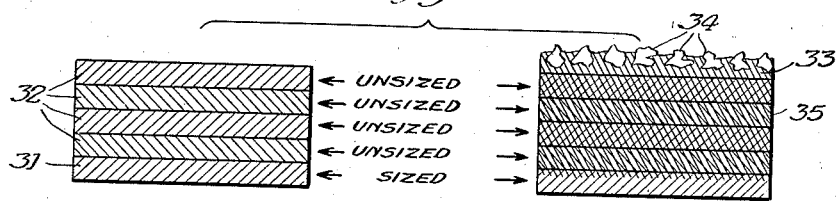

Referring now to the form of the invention disclosed in Figure 7, here there is provided the one sized layer 31 and a plurality of unsized layers 32 to which may be applied a binder 33 for grit particles 34. In this instance the grit binder 33 strikes through one or more of the unsized layers, as indicated by the cross hatching 55 so that it tends to prevent laminating of the backing in use.

Figure 8:
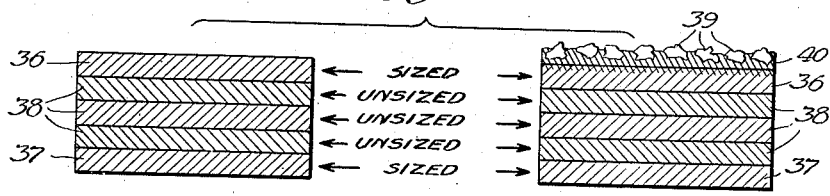

As a further modification wherein it is desired to retain the flexible features of the unsized layers but at the same time to present a unified surface adjacent to the grit and on the back side of the article, the paper of the form shown in Figure 8 may be employed in which the two outside plies 36 and 37 are sized and the two or three, as the case may be, inner plies 38 are unsized.

A grit layer, indicated at 39, may be attached to one of the sized outer layers 36 by a bonding coat 40.

Figure 9:
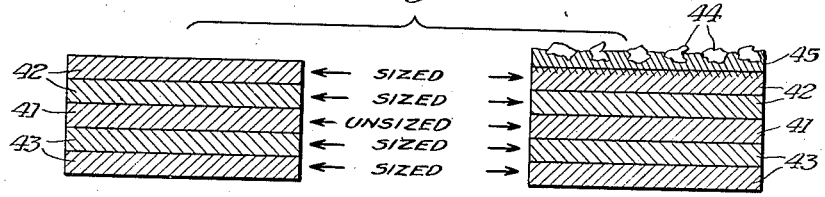

A still further modification of the invention is that shown in Figure 9. This is similar to the form of the invention shown in Figure 8, but instead of leaving three unsized inner layers, as in Figure 8, there is provided only one unsized layer 41, the outer layers 42, 42 and 43, 43 being sized.

A grit layer 44 is firmly attached to the outer sized layers 42 by a bonding coat 45.

Figure 10:
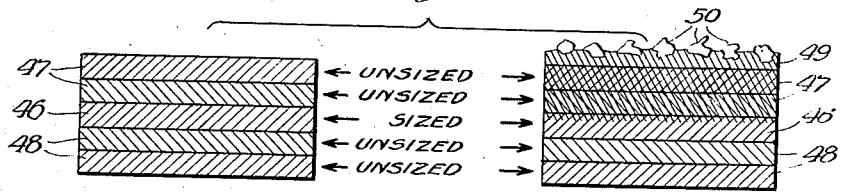

A modification, more particularly of the form of the invention shown in Figure 9 is shown in Figure 10, it being desirable under some conditions to obtain a paper of extreme flexibility even when coated, and in this case the innermost ply 46 is sized, and the outer plies 47, 47 and 48, 48, are unsized. In this form of the invention the binder 49 for grit 50 strikes through the two unsized plies 47, attaches itself to these unsized plies 47, and said plies to each other and to the inner sized ply 46.

A still further modification of the backing of the present invention is disclosed in Figure 11. In this composite view, the paper backing, indicated at 51, is composed of a plurality of plies, the three innermost plies 52 being sized and the back ply 53 being either sized or unsized as desired.

The outermost ply on the front of the paper 54 is then treated with a rubber-resin or other flexible saturating solution, indicated by the stippling appearing at 55 in the middle illustration of Figure 11.

To this rubber-resin saturated ply is applied the binder 56 for retaining grit 57.

The advantages of this composite structure are added to by the fact that in some instances the grit bond 56 may be of a nature which is miscible with the rubber-resin solution and thus, due to the affinity which such a grit bond has for the saturating solution, tends to increase the tenacity with which the bond adheres to the backing and to the grit.

In Figure 12 a further alternative form of the invention is employed wherein the intermediate or innermost layers or plies of paper, indicated at 58, may be either sized or unsized, as desired, and the two outer layers, 59 and 60, may be sized with either a glue such as a hide glue or the like, or with a rubber-resin solution such as disclosed herein. This sizing is indicated by stippling in Figure 12.

It will be understood that the grit bonding coat 61 for retaining the grit 62 may be applied to either side of a sheet constructed as shown in Figure 12.

It will be understood that, while I have illustrated herein backings having various characteristics as to the paper plies amounting to five plies only, a lesser number of plies may be employed with satisfactory results, and that I do not limit the invention to a sheet employing only five plies but that such a sheet might contain more or less plies as demanded by the uses to which the paper or completed abrasive article is to be adapted.

I have discovered that, in the manufacture of paper of the character herein disclosed, I am enabled to incorporate, in a single sheet of stock, layers of different types so that some of the layers may be of a saturating type and others of a non-absorbent or non-saturating type and that I may employ plies which have different characteristics as to the nature of the fibres. For example, some of the plies may be of long fibres and others of the plies may be of short fibres.

With this in mind, in the manufacture of paper of this character, I have employed separate beaters such as diagrammatically shown at 63, 63 in Figure 13, each of the beaters having its chamber 64 and paper receiving roller 65 over which the web of paper 66 is supplied to calender rolls, indicated at 67 and 68. Each of the plies 66 in desired number may be of different characteristics or they may be of the same characteristic, depending on the nature of the final sheet to be manufactured.

It will be understood that in the individual beaters, a particular preparation of the paper stock to be produced may be resorted to and that individual treatment in each beater may determine whether the paper stock will be hydrated to a high or low degree, also to regulate whether the paper stock issuing from the beater will have a high or low sizing coating, and, to some degree, whether the paper finally issuing from the beater is to have long or short fibres.

By variation of the amount of sizing, together with the degree of hydration and fibre length of the pulp supplied in the individual circulating system of each beater I am enabled to produce a paper which varies from ply to ply in character and thereby am enabled to regulate the absorbency, saturating ability, and other physical characteristics such as strength, hardness, and toughness.

While the foregoing described beaters are not generally applicable to Fourdrinier type of paper which is usually made in a single ply, yet I am enabled to treat Fourdrinier paper by the rubber-resin saturating solution described herein so as to prevent peeling and other lamination and still retain the desirable flexible characteristics in such paper.

A further advantage of the rubber-resin treatment of paper, either that which is formed in plies commonly used in cylinder paper, or the Fourdrinier single ply paper, is that the rubber-resin compound employed for saturating the paper has utility for use in connection with waterproofing binders for waterproofing sandpaper such, for example, as varnish and oil binders, cellulosic material binders and phenol formaldehyde and other Bakelite or synthetic grit binders.

A further alternative form of the invention is shown in Figure 14. For some purposes in the past, it has been desirable to employ as a backing for abrading discs and the like a composite sheeting which is a combined paper and cloth structure, and it has been customary to apply the grit and its binder in such a composite structure to the cloth side of the sheet. However, while a relatively strong backing is thus afforded, it does not possess as desirable flexible characteristics as the form of the invention shown in Figure 14. Furthermore, by virtue of the coating and the treatment of the paper disclosed in Figure 14, a union between the adhesive for retaining the grit an dthe binder for combining the paper with the cloth takes place so that a substantially homogeneous structure is thus afforded.

In Figure 14 a plurality of layers of paper, indicated at 69, may have one or more of them sized as desired and to one surface of this paper there is applied a cloth or reticulated fabric 70 secured thereto by an adhesive material 71 which may be allowed to strike through into the outermost ply of the paper sheet and thus make a substantially homogeneous connection between the cloth and paper at this surface.

The grit layer 72 is then applied and its binder 73 strikes into the binder 71, as indicated at 74, at the right hand portion of Figure 14. In this way the outermost binding coat has, in effect, formed a substantially homogeneous connection with the inner binder 71 and thus not only is the fibre cohesion in the paper enhanced but the bond between the abrasive and the sheet is materially helped.

In the form of the invention shown in Figure 14, I thus provide for added cohesion between the fibres of the paper portion of the backing and also increase the adhesion between the grit binding coat and the paper and cloth combined backing. Due to the presence of the reticulated fabric at the junction between the two layers of glue, a tendency for shearing or laminating or the like is substantially eliminated from the resultant abrasive article.

Having thus described my invention and illustrated its use, what I claim as new and desire to secure by Letters Patent is:

1. A new article of manufacture, sheeted cellulosic material including a plurality of associated sized and unsized laminated layers, the unsized layers being adjacent the exposed surfaces thereof, and an adhesive having penetrative properties containing an abrasive material and applied to an unsized layer and adapted to strike through the same and adhere to a sized layer the relationship of the sizing of the sized and unsized layers being a factor of the sheet forming process.

2. A new article of manufacture, sheeted cellulosic material including a plurality of associated sized and unsized laminated layers, the unsized layers being adjacent the exposed surfaces thereof, and a flexible and waterproof adhesive having penetrative properties containing an abrasive material and applied to an unsized layer and adapted to strike through the same and adhere to a sized layer the relationship of the sized and unsized layers being a factor of the sheet forming stages of the manufacture of said layers.

3. As a new abrasive article, a cellulosic backing containing a rubber-resin flexibilizing agent and a layer of grit containing adhesive applied to one side of said backing.

4. In an abrasive article, a flexible backing having a plurality of plies, an outer ply being unsized when the backing is originally formed, and having inner plies of a lesser degree of absorbency, determined independently, during the sheet forming stages of the manufacture of said inner plies said outer ply being treated with a penetrative adhesive for increasing the adhesion between the plies, and a binder layer having an abrasive material applied to said outer ply resulting in a predetermined integration and flexibility of the composite.

5. In an abrasive article, a flexible backing having a plurality of plies, an outer ply being unsized when the backing is originally formed, and having inner plies of a lesser degree of absorbency, determined independently, during the sheet forming stages of the manufacture of said inner plies said outer ply being treated with a penetrative adhesive for increasing the adhesion between the plies, and a penetrative binder layer having an abrasive material applied to said outer ply resulting in a predetermined integration and flexibility of the composite.

6. In an abrasive article, a flexible paper backing having portions possessing varying decreasing degrees of affinity for saturating solutions from an outer side inwardly and having an exposed absorptive layer the absorptive affinity factor being determined during the paper making stages, said exposed layer being saturated with an adhesive for increasing the adhesion between the portions of said backing, and a binder and abrasive material applied to one surface of said backing resulting in a predetermined integration and flexibility of the composite.

7. A new article of manufacture, sheeted cellulosic material, a grit and a layer of adhesive for attaching said grit to said sheeted material, and a flexing agent serving for a binder for unifying the fibres of the sheeted material including a rubber-resin solution incorporated in said sheeted material.

8. In a flexible abrasive article, a flexible backing having a plurality of plies, the outer plies being relatively more absorbent than the inner plies, said backing having incorporated therein a penetrative flexible adhesive for maintaining a predetermined flexibility thereof and for increasing the adhesion between the plies, and a binder layer including therein abrasive particles applied to one of said outer plies resulting in a predetermined integration and flexibility of the composite.

9. A composite sheet cellulosic material having multiple plies of different absorbency characteristics and a woven fabric applied to one surface of said sheet and adjacent the face of a higher order of absorbency and an adhesive and layer of grits applied to said woven fabric integrating the composite into a sheet of predetermined flexibility.

10. A composite sheet cellulosic material having multiple laminated plies of different absorbency characteristics determined independently during the formation of the plies and an adhesive and layer of grit carried by one side of said sheet integrating the composite into a sheet of predetermined flexibility.

11. A paper sheet having a plurality of sized and unsized laminated plies the relationship of which is determined by a factor during the paper making stages, and a saturating solution entrained in one of said unsized plies for integrating the composite and an adhesive and layer of grit carried by said saturated ply integrating the composite into a sheet of predetermined flexibility.

12. In an abrasive article, a cellulosic backing including a composite woven and fibrous sheet, the fibrous portion having an absorbent ply or layer having a different degree of absorbency than the composite constituting the remainder of the fibrous sheet, and an adhesive retaining a layer or grit applied to the woven portion of said backing.

13. In an abrasive article, a cellulosic backing including a composite woven and fibrous sheet, the fibrous portion having a plurality of plies including an absorbent ply or layer of a different degree of absorbency from the other portions of the composite comprising the fibrous sheet, the absorbency factor being determined during the sheet forming process of the fibrous sheet, and an adhesive retaining a layer of grit applied to the woven portion of said backing.

14. In an abrasive article, a cellulosic backing including a composite woven and fibrous sheet, the fibrous portion having an independent absorbent ply or layer, of a different degree of absorbency than the other portion of the composite, comprising the fibrous sheet and lying next adjacent to said woven portion, and an adhesive retaining a layer of grit applied to said backing.

15. In an abrasive article, a cellulosic backing including a composite woven and fibrous sheet, the fibrous portion having an independent absorbent ply or layer of a different degree of absorbency from the other portions of the composite comprising the fibrous sheet, determined independently during the sheet forming stages of the fibrous sheet, said sheet lying next adjacent to said woven portion, and an adhesive retaining a layer of grit applied to the woven portion of said backing.

16. An abrasive device including a composite woven and fibrous backing, the fibrous portion including a plurality of plies having different individual absorbency characteristics determined independently during the manufacturing stages of the plies, and enhancing the flexibility of the composite, and a layer of adhesive retaining grit particles and applied to said backing.

17. As a new abrasive article, a cellulosic backing containing a rubber-resin flexibilizing agent compatible to aqueous and waterproof adhesive binders, and a layer of grit containing adhesive applied to one side of said backing.

BERT S. CROSS.